(12) United States Patent
Petersson

(10) Patent No.: US 8,089,422 B2
(45) Date of Patent: Jan. 3, 2012

(54) REFLECTOR

(75) Inventor: Mikael Petersson, Göteborg (SE)

(73) Assignee: Saab AB, Linköping (SE)

( * ) Notice: Subject to any disclaimer, the term of this patent is extended or adjusted under 35 U.S.C. 154(b) by 436 days.

(21) Appl. No.: 12/293,178

(22) PCT Filed: Mar. 6, 2007

(86) PCT No.: PCT/EP2007/052090
§ 371 (c)(1),
(2), (4) Date: Feb. 18, 2009

(87) PCT Pub. No.: WO2007/104674
PCT Pub. Date: Sep. 20, 2007

(65) Prior Publication Data
US 2009/0219222 A1 Sep. 3, 2009

(30) Foreign Application Priority Data
Mar. 16, 2006 (EP) .................................. 06111265

(51) Int. Cl.
H01Q 15/14 (2006.01)
(52) U.S. Cl. .................... 343/912; 343/DIG. 2
(58) Field of Classification Search .............. 343/912, 343/915, DIG. 2
See application file for complete search history.

(56) References Cited

U.S. PATENT DOCUMENTS

| | | | |
|---|---|---|---|
| 2,747,180 A | 5/1956 | Brucker | |
| 3,716,869 A * | 2/1973 | Gould et al. | 343/779 |
| 5,178,709 A | 1/1993 | Shimodaira et al. | |
| 5,644,322 A * | 7/1997 | Hayes et al. | 343/915 |
| 5,686,930 A * | 11/1997 | Brydon | 343/912 |
| 5,945,955 A | 8/1999 | Glover et al. | |
| 6,018,328 A | 1/2000 | Nolan et al. | |
| 7,301,507 B2 * | 11/2007 | Petersson | 343/912 |
| 2006/0227063 A1 | 10/2006 | Richer et al. | |

FOREIGN PATENT DOCUMENTS

| | | |
|---|---|---|
| EP | 0741435 A | 11/1996 |
| EP | 0948085 A2 | 10/1999 |
| EP | 1589612 A | 10/2005 |

OTHER PUBLICATIONS

PCT/ISA/210—International Search Report—May 16, 2007.

* cited by examiner

Primary Examiner — Tho G Phan
(74) Attorney, Agent, or Firm — Venable LLP; Eric J. Franklin

(57) ABSTRACT

A reflector including a reflector dish and a backing structure. The reflector dish has a reflecting surface and a back surface. The backing structure is arranged in a pattern on the back surface of the reflector dish for supporting and stiffening the reflector dish. The backing structure includes a first backing structure skin and a second backing structure skin and a backing structure core there between. The core is substantially thicker than each skin. The backing structure is arranged such that the first backing structure skin is faced against the back surface of the reflector dish. Also, a method of manufacturing a reflector.

12 Claims, 2 Drawing Sheets

REFLECTOR

CROSS-REFERENCE TO RELATED APPLICATIONS

This application claims priority to European patent application 06111265.2 filed 16 Mar. 2006 and is the national phase under 35 U.S.C. §371 of PCT/EP2007/052090 filed 6 Mar. 2007.

FIELD OF THE INVENTION

The present invention relates to the field of electromagnetic wave reflectors and manufacturing methods for such reflectors.

BACKGROUND OF THE INVENTION

Electromagnetic wave reflectors are used in the design of antennas in the telecommunication field. The antennas are in particular used in space applications to equip telecommunications satellites. An antenna with a conventional configuration is composed of a radio frequency source and a reflector with a parabolic form whose concave reflector surface constitutes the active surface. A source is placed at the focal point of the reflector and is designed to emit or receive electromagnetic radiation focalized by the reflector. The reflector can also have other shapes than parabolic, e.g. convex or numerically determined.

Certain applications require large reflectors. However, in any type of space application there is always a need for weight optimization. It is therefore essential to find a reflector which may be made light-weight without losing the required electromagnetic properties.

U.S. Pat. No. 6,018,328 discloses a light-weight reflector having a reflector shell made of a polymeric laminate material and the shell is supported of a backing structure on the back surface of the shell. The backing structure is formed on silicon mandrels loosely on the reflector shell and is made of polymeric laminate material. After curing the backing structure, the mandrel is removed and the structure is arranged on the reflector shell by means of integral clips.

In EP 948 085 is a reflector shown having a backing structure. The reflector dish is formed of a graphite composite laminate and the backing structure is formed of upstanding integral ribs cut from flat laminate.

U.S. Pat. No. 2,747,180 discloses a reflector with a honeycomb core. The reflector construction gives a light weight and rigid reflector that does not require a separate support structure. The reflector is a sandwich construction which may be manufactured by performing multiple operations in a mould tool.

The inventor has developed a light-weight reflector and a method of manufacturing a reflector which is disclosed in EP 1 589 612. A first skin is arranged on a mould, where after a core is arranged on the skin, and then the assembly is cured. The core is then machined to a pattern which forms the backing structure. A second skin is arranged on the core and the complete assembly is cured. The reflector is light-weight and has good thermal properties.

In space applications, the antennas need to be as light as possible so as to facilitate the placing in orbit of a satellite equipped with antennas with reflector dishes. The reflectors also need to be stiff. There is a need to produce light-weight reflectors having good properties, wherein the production method is easy to apply, not so time-consuming and not so expensive.

SUMMARY OF THE INVENTION

It is an object of the invention to provide a new electromagnetic wave reflector and a method of manufacturing such a reflector.

This is achieved by a reflector comprising a reflector dish and a backing structure, wherein the reflector dish has a reflecting surface and a back surface, and wherein the backing structure is arranged in a pattern on the back surface of the reflector dish for supporting and stiffening the reflector dish. The backing structure comprises a first backing structure skin and a second backing structure skin and a backing structure core there between, wherein the core is substantially thicker than each skin. The backing structure is arranged such that the first backing structure skin is arranged on the back surface of the reflector dish. The backing structure is arranged so that the whole first backing structure skin abuts against the back surface of the reflector dish. This also means that the whole backing structure, i.e. the surface directed to the reflector dish abuts against the back surface of the reflector dish. A light-weight reflector which is stable, easy to manufacture and not so expensive is obtained.

The core may comprise a first layer of honeycomb structure, which is favourable for light-weight and stability. The honeycomb structure may be a fibre reinforced plastic honeycomb structure or an aluminium honeycomb structure.

The backing structure may be arranged in at least two directions across the reflector dish, which will give the reflector stability in different directions. Hence, the backing structure may comprise elongated portions arranged in a pattern in at least two directions across the reflector dish. Further, the backing structure may comprise a circumferential portion, which also will provide the reflector with a more stable support.

Each skin may comprise at least one layer of fibre reinforced plastic comprising fibres arranged in at least three directions. Fibres in several directions give the layer good strength and thermo-elastic properties in all directions.

The reflector dish may be of any kind of reflector on which the backing structure can be applied. It may be of the same kind of sandwich construction which the backing structure is formed of. Hence, the reflector dish may comprise a first reflector dish skin and a second reflector dish skin with a reflector dish core there between, and wherein the reflector dish core is thinner than the backing structure core. This kind of sandwich construction has appeared to fit very well to constitute a light-weight stable construction of the reflector dish.

In a second aspect of the invention, there is provided a method of manufacturing a reflector as described above. The method comprises the steps of:

a) preparing a reflector assembly
   by forming a reflector dish on a mould tool,
   forming a backing structure by
   arranging a first backing structure skin in a pattern on the back surface of the reflector dish,
   arranging a backing structure core on the first backing structure skin,
   arranging a second backing structure skin on the backing structure core;
b) curing the assembly, and
c) removing the assembly from the mould.

The method is easy to apply and there is no waste of core material.

Curing may be performed between any of the steps of arranging the skins and the core. The curing may be needed between the steps in order to stabilise the part of the reflector before adding another skin or core of the reflector.

The backing structure is arranged in a pattern for supporting and stiffening the reflector dish. The backing structure may be arranged as elongated portions in a pattern in at least two directions across the back surface of the reflector dish, which will give the reflector stability in different directions. This is made by that the backing structure (5) is formed by arranging elongated parts (9a, 9b) of the first backing structure skin (6), the backing structure core (8) and the second backing structure skin (7) in a pattern in at least two directions across the back surface (4) of the reflector dish (2). Further, a portion of the backing structure may be arranged circumferential on the back surface of the reflector dish, which also will provide the reflector with a stable support. This is made by that the method comprises a step of arranging a portion of the backing structure circumferential on the back surface (4) of the reflector dish (2).

The reflector dish may be produced on the mould tool by producing a reflector dish assembly before forming the backing structure by the steps of:

arranging a first reflector dish skin on a mould tool,
arranging a reflector dish core on the first reflector dish skin,
arranging a second reflector dish skin on the reflector core,
curing the reflector dish assembly.

The manufacturing method enables a substantial reduction in the production time for a reflector. The manufacturing may also be performed accurately when the reflector backing structure is manufactured in a one mould operation. Further, there is no waste of material, which is also saving expenses. There is also a substantial reduction in the number of parts compared to a conventional reflector design, thus limiting the number of drawings, parts manufacturing, assembly steps and the need for assembly fixtures.

Additional features and advantages of the invention will appear more clearly from the following detailed description of a preferred embodiment of the invention, which is given by way of non-limiting example only and with reference to the accompanying drawings.

DETAILED DESCRIPTION OF EMBODIMENTS OF THE INVENTION

Figure 2:
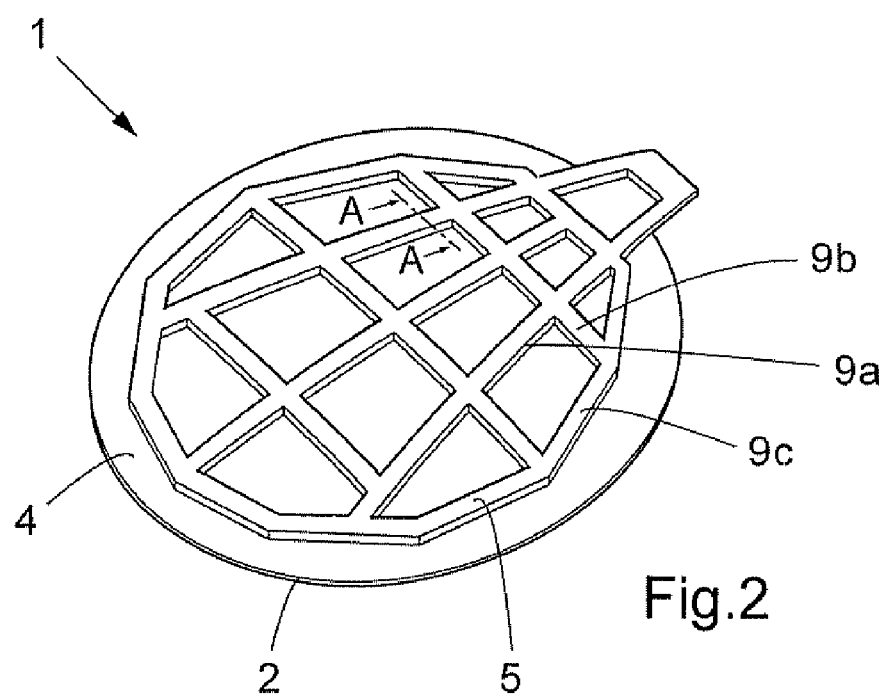
FIG. 2 discloses a back surface of a reflector with a backing structure.
Figure 3:
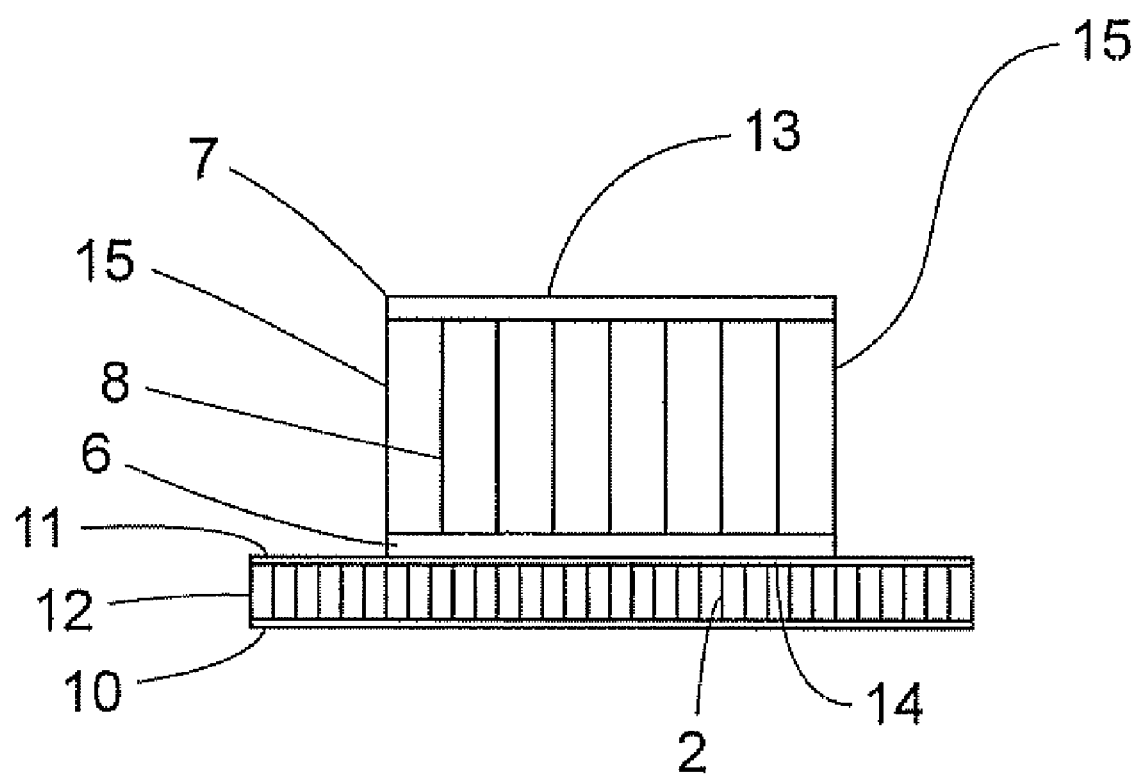
FIG. 3 is a cross-sectional view of a section A-A, for an embodiment of a reflector.

According to one embodiment, the invention refers to a reflector 1, shown in FIG. 2, comprising a reflector dish 2 and a backing structure 5, wherein the reflector dish 2 has a reflecting surface 3 and a back surface 4, and wherein the backing structure 5 is arranged in a pattern on the back surface 4 of the reflector dish 2 for supporting and stiffening the reflector dish 2. In FIG. 3 a cross-sectional view of a section A-A in FIG. 2 is shown. The backing structure 5 comprises a first backing structure skin 6 and a second backing structure skin 7 and a backing structure core 8 there between, wherein the core 8 is substantially thicker than each skin 6, 7 and the backing structure 5 is arranged such that the first backing structure skin 6 is arranged on the back surface 4 of the reflector dish 2. The backing structure 5 is arranged in a pattern on the back surface 4 of the reflector dish. The whole backing structure is arranged so it abuts against the back surface 4 of the reflector dish. This pattern is necessary for supporting and stiffening the reflector dish. The backing structure 5 in the form of the first backing structure skin 6, second backing structure skin 7 and backing structure core 8 can be considered as a sandwich construction. The reflector dish may be any kind of suitable reflector dish, such as a laminate skin reflector dish or a reflector dish having a sandwich construction. A reflector dish having a sandwich construction will be described further below.

The reflecting surface may have an essentially parabolic surface, while the back surface then may have a corresponding surface reversed to a parabolic surface. Other shapes of the surface are also possible. The reflecting surface can also be shaped to provide Rf pattern shapes that match geographical locations where to transmit signals. The backing structure will follow the shape of the reflector dish also with respect to deviations from a parabolic surface or any other surface.

Figure 1:
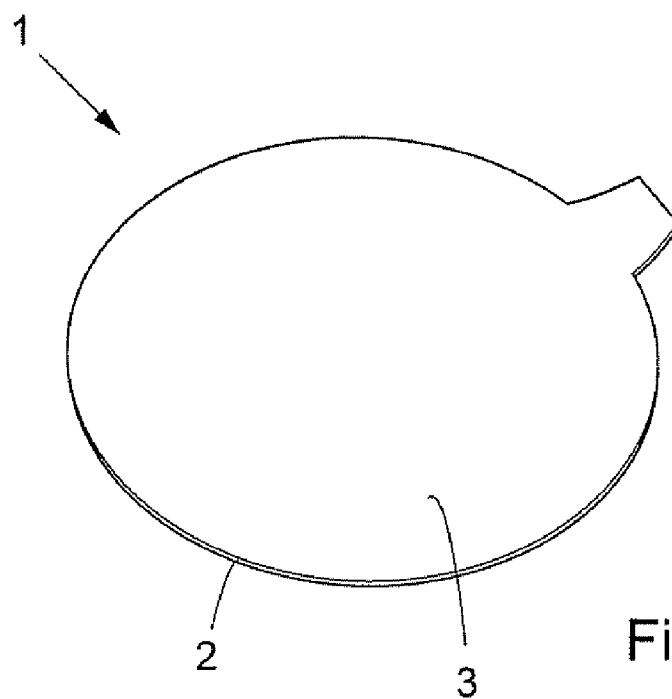
FIG. 1 discloses a reflective surface of a reflector.

FIG. 1 discloses a reflective surface 2 of the reflector 1. FIG. 2 discloses one embodiment showing a back surface 4 with a backing structure 5 for a reflector 1, where the backing structure 5 shows a structure which is stiffening and supporting. The disclosed backing structure 5 is one example of many possible structures. The backing structure 5 for the reflector 1 is arranged in the form of a sandwich structure as disclosed above. In FIG. 2, the backing structure 5 is disclosed in a pattern on the back surface 4 of the reflector 2. The backing structure may be in the form of any suitable pattern that would ensure the desired stiffening qualities. The backing structure 5 disclosed in FIG. 2 is one embodiment for a backing structure 2. However, this structure may also be formed by interconnected circumferential elements, rectilinear ribs, curved segments or by any such combination.

The core 8 that is comprised in the sandwich construction in the backing structure may comprise a first layer of honeycomb structure. However, the core 8 may also include metallic or plastic foam, ceramic or polymeric material. The core 8 may also include more than one layer of honeycomb material, where the different layers of honeycomb material may provide different qualities for the core 8. In areas in the vicinity of an attachment point of the backing structure, the sandwich may include local stiffening e.g., in the form of a honeycomb material with higher density or by increasing the thickness of the first and second skin. Highly stressed areas of parts of the backing surface might require core material with higher density and/or better structural properties. Materials having different properties can be combined in the core in order to provide a reflector with extra good characteristics. An attachment point or area as discussed may be the location, where two parts of a backing structure extending in different directions intersect. On such an intersection an insert or a group of inserts may be situated for mounting the reflector on a satellite or for the attachment of other parts, such as deployment mechanisms, hold down and release mechanisms etc. A stronger material to support the insertion may be necessary, which will be ensured by a material with a higher density or thickness in the core material. This could relate to both the backing structure core 8 and the reflector dish core 12.

The honeycomb structure may be a fibre reinforced plastic honeycomb structure or an aluminium honeycomb structure. It is also possible to include a combination of an aluminium honeycomb and a fibre reinforced plastic honeycomb in the core of the backing structure. Further, the core may comprise at least one additional layer made of a different material than the first layer. Materials with different characteristics may be combined to give the core suitable properties.

The backing structure may comprise elongated portions 9a, 9b arranged in a pattern in at least two directions across the reflector dish 2. FIG. 2 discloses a pattern of a backing structure 5. The backing structure is arranged in at least two directions, which can be seen in the form of backing structure portions 9a, 9b. The backing structure portions 9a and 9b are arranged in two directions, and they intersect with each other in the embodiment shown in FIG. 2. The backing structure may also comprise a circumferential portion 9c. This is only one example of a pattern forming a backing structure. The backing structure portions could be arranged in more than two directions, such as at least three or four directions. A backing structure may also be formed of for example interconnected circumferential portions, curved segments or by any such combination. The pattern depends on which application the reflector is intended for.

The backing structure core 8 is sandwiched between a first backing structure skin 6 and a second backing structure skin 7. Each skin may comprise at least one layer of fibre reinforced plastic comprising fibres arranged in at least three directions. The fibres may be arranged as netting in a tissue or by arranging a lay-up of multiple laminates with fibres in one or more directions. If one set of fibres in the first skin 6 is given a direction of 0°, the two other directions would preferably be ±60°. It is also possible to use a configuration with two fabric layers of fibre reinforced plastic, each containing fibres in two directions and arranged in such a way that the skin contains fibres in four directions. The skin may be made of a so called prepreg which is a preimpregnated mat of fibres.

The fibres used in the different layers could be any suitable fibres. Carbon fibres could be used, since they have very low coefficient of expansion. Fibres made of aromatic polyamide, such as Kevlar, are also suitable to use as a material in the skins of the reflector.

The lay-up of the second skin 7 may be a symmetric lay-up to the lay-up of the first skin 6, i.e., the fibres in the second skin 7 are arranged as a reflection of the fibres in the first skin 6. With fibres arranged in three directions 0°, +60°, −60° in the first skin 6, the direction in the second skin 7 would preferable be −60°, +60°, 0°.

In one embodiment of the invention, the first backing structure skin 6 includes a lay-up of at least three layers of fibre reinforced plastic. The layers are arranged so that the fibres in each layer are directed in a direction that differs from that of the fibres in the previous layer to ensure good supporting qualities in the reflector as well as good structural and thermo-elastic behaviour. The first backing structure skin can also be made of at least one fabric layer of fibre reinforced plastic, containing fibres in three directions, or by at least two fabric layers of fibre reinforced plastic, each containing fibres in two directions.

FIG. 3 discloses a cross-section along section A-A of a reflector 1, shown in FIG. 2. The first skin 6 of the backing structure 5 includes a layer of fibre reinforced plastic. It may also include further layers of fibre reinforced plastic. If several layers are used in the first skin 6, a symmetrical lay-up of layers is preferably used in the second skin 7 giving the backing structure good thermo-elastic behaviour. For good stability for the backing structure 5, the second skin 7 should include a fibre arrangement matching the fibre arrangement of the first skin 6.

The reflector dish may be any suitable kind of reflector dish. It could for example be a sandwich construction comprising similar materials as the sandwich construction of the backing structure. It could also be a skin laminate.

Thus, according to one embodiment, the reflector dish 1 comprises a first reflector dish skin 10 and a second reflector dish skin 11 with a reflector dish core 12 there between, and the reflector dish core 12 is thinner than the backing structure core 8. The reflector dish skins and the reflector dish core may be of the same kind as used in the backing structure skins and the backing structure core. Such a combination is suitable for good stability and good thermal properties. The thickness of all parts of a reflector is depending on the structural requirements like acoustic noise, vibration levels, number of attachment points etc.

For a typical reflector size of about 2.2 m, the thickness of the backing structure skins are about 0.25 to 0.5 mm and the thickness of the backing structure core is about 45 mm. The thickness of the reflector dish skins are about 0.1 to 0.25 mm and the thickness of the reflector dish core is about 5 mm.

The thickness of the backing structure core, the thickness of the skins depends on the application, the size of the reflector, the selected material etc. The widths of the elongated parts of the backing structure may also vary, as the height of the backing structure may vary over the pattern.

The reflector is intended for space applications, such as in antennas and satellites.

Further, the present invention refers to a method of manufacturing a reflector as described above. The reflector thus comprises a reflector dish 2 and a backing structure 5, wherein the reflector dish 2 has a reflecting surface 3 and a back surface 4, and wherein the backing structure 5 is arranged on the back surface 4 of the reflector dish for supporting the reflector dish 2. The method comprises the steps of:

a) preparing a reflector assembly by
forming a reflector dish 2 on a mould tool,
forming a backing structure 5 by
arranging a first backing structure skin 6 in a pattern on the back surface 4 of the reflector dish 2,
arranging a backing structure core 8 on the first backing structure skin 6,
arranging a second backing structure skin 7 on the backing structure core 8;
b) curing the assembly, and
c) removing the assembly from the mould.

The skins are not cured before arranging them on the backing structure and are easily shaped in the same form as the shape of the previous material on the mould tool.

The reflector dish may be produced in any suitable way on the mould tool. It can be any suitable reflector dish which may be supported by the backing structure according to the present invention.

When manufacturing the reflector, the reflector dish 2 is formed with the reflecting surface 3 against the mould tool. A first backing structure skin 6 is cut from a skin material, such as a prepreg material. This skin 6 is applied in a pattern on the back surface 4 of the reflector dish 2. This first backing structure skin 6 may be applied in form of several layers, or as one separate layer. On the skin is a backing structure core 8 applied in essentially the same pattern as the first skin. The core may be cut to fit the form of the first backing structure skin 6. Further, on top of this core 8 the second skin 7 is applied in essentially the same pattern as the first backing structure skin 6 and the backing structure core 8. The skins 6,7 are formed of one or several layers. If several layers which are different are applied, preferably the layers in the first and second skins correspond to each other in a reflecting way. One kind of layer close to the core 8 in the first skin 6 should for example be close to the core 8 also in the second skin 7, and one kind of layer furthest away from the core 8 in the first skin 6 should be furthest away from core 8 also in the second skin 7. This will compensate for optional stresses in the different layers.

The pattern of the backing structure 5 may be formed of several portions, such as several elongated portions applied in the desired pattern. Elongated skin portions are applied in the pattern and there after elongated core portions on the skin and thereafter skin portions on the core. The elongated portions 9a, 9b may go from one side to another on the back side 4 of the reflector dish. Alternatively, the portions are divided in smaller parts and applied after each other or next to each other, so they will form the elongated portions in the desired pattern. At intersections the portions may be formed by applying parts after each other or next to each other. It is also possible to apply a skin or core having the desired pattern of an intersection.

A curing step may be performed between any of the steps of arranging the skins and the core.

According to one embodiment, the method comprises arranging the skin on the back surface of the reflector dish comprising a layer of fibre reinforced plastic having fibres extended in at least three directions. Such a layer may be of the kind described above regarding the backing structure. Further, the method may comprise arranging at least three layers of fibre reinforced plastic so that the fibres extend in three directions. The method may also comprise arranging at least two layers of fibre reinforced plastic, each containing fibres in two directions, so that the fibres extend in four directions. Many examples of how to arrange layers can be used. However, it is important that the fibres extend in different directions sot that the backing structure will be stable.

The backing structure 5 may be arranged as elongated parts 9a,9b in a pattern in at least two directions across the back surface 4 of the reflector dish 2. This is important for the stability of the reflector dish given from the backing structure 5. A portion 9c of the backing structure could be arranged circumferential on the back surface 4 of the reflector dish 2.

The manufacturing sequence to produce the reflector dish assembly on the mould tool before forming the backing structure may comprise the steps of:
- arranging a first reflector dish skin 10 on a mould tool,
- arranging a reflector dish core 12 on the first reflector dish skin 10,
- arranging a second reflector dish skin 11 on the reflector core 12,
- curing the reflector dish assembly.

During manufacture of the reflector dish a first reflector skin is applied to a mould tool. The first reflector skin may be of the same kind as the first backing structure skin. However, the skin will cover essentially the whole mould tool. The skin could be applied in the form of one layer or several layers. The layers may include at least three layers of fibre reinforced plastic, with different direction of the fibres in each layer. The skin could also include a layer of at least one fabric layer of fibre reinforced plastic, containing fibres in three directions. Further, the skin could also include at least two fabric layers of fibre reinforced plastic, each containing fibres in two directions and arranged in such a way that the skin contains fibres in four different directions. After the first skin 10 is applied, the core 12 is applied on top of the skin 10. The second reflector dish skin 11 may then be arranged in the same way as the first reflector dish skin 10 but on top of the core 12. Curing could also be applied between arranging the skins 10,11 and the core 12.

The materials used in the reflector dish skin and the reflector dish core are of the same kind as those used in the backing structure skin and the backing structure core.

Resin layers may be applied between the skins and the core or between the backing structure and the reflector dish. It is also possible to use prepreg fibre reinforced plastic, in which case the resin is included in the material of layers. It is sometime suitable to use adhesive layers between the skins and the core, or between the reflector dish and the backing structure.

A reflector dish may also be produced on the mould tool by any other suitable method. For example a skin laminate may be formed on the mould tool, where after the backing structure is formed according to the method described above.

The curing may be applied in an autoclave press or an oven.

The backing structure can be considered to have a top side 13, bottom side 14 and side edges 15. The top side 14 is the outer side of the second skin 7 and the bottom side 14 is the lower side of the first skin 6. The side edge 15 is thus the edge extending between the top side 13 and the bottom side 14.

Under certain circumstances during the manufacturing step in the autoclave, the backing structure may need to be supported on the side edges 15. Otherwise the backing structure 5 may break if for example the pressure is too high in the autoclave for the selected material. The support may be formed of for example an elongated portion of foam plastic extending along the side edges 15 of the backing structure 5. The area between the foam plastic may also need to be covered by foam plastic or honeycomb material of the same height as the backing structure. Foam plastic and honeycomb material are only mentioned as examples of material. The area between the foam plastic would mainly correspond to one of the squares shown in FIG. 2 between the elongated portions 9a, 9b, except for the side edge supports. Any suitable material can be used for supporting the backing structure 5 on the side edges 15 during this part of the process. The side edge supports are removed after the autoclave curing step. The side edge supports are temporary connected to the reflector dish, i.e. the second reflector dish skin, by means of tape and paste adhesive during the autoclave curing. Tape is used towards the second reflector dish skin and paste adhesive between the tape and the side edge supports. The side edge supports are removed by loosening the tape from the second reflector dish skin.

The described embodiments of the invention are by no means exhaustive, but illustrative of the present invention. The person skilled in the art will readily appreciate that modifications may be made without departing from the scope and spirit of the present invention.

The invention claimed is:

1. A reflector, comprising:
a reflector dish comprising a reflecting surface and a back surface; and
a backing structure arranged in a pattern on the back surface of the reflector dish for supporting and stiffening the reflector dish, the backing structure comprising a first backing structure skin and a second backing structure skin and a backing structure core there between, wherein the core is substantially thicker than each skin, and wherein the backing structure is arranged such that the first backing structure skin is arranged on the back surface of the reflector dish.

2. The reflector according to claim 1, wherein the core comprises a layer of honeycomb structure.

3. The reflector according to claim 2, wherein the honeycomb structure comprises a reinforced plastic honeycomb structure or an aluminium honeycomb structure.

4. The reflector according to claim 1, wherein the backing structure comprises elongated portions arranged in a pattern in at least two directions across the reflector dish.

5. The reflector according to claim 4, wherein the backing structure comprises a circumferential portion.

6. The reflector according to claim 1, wherein each skin comprises at least one layer of fiber reinforced plastic comprising fibers arranged in at least three directions.

7. The reflector according to claim 1, wherein the reflector dish comprises a first reflector dish skin and a second reflector dish skin with a reflector dish core there between, and wherein the reflector dish core is thinner than the backing structure core.

8. A method of manufacturing a reflector, the method comprising:
- preparing a reflector assembly by
  - forming a reflector dish on a mold tool,
  - forming a backing structure by arranging a first backing structure skin in a pattern on a back surface of the reflector dish,
  - arranging a backing structure core on the first backing structure skin,
  - arranging a second backing structure skin on the backing structure core;
- curing the assembly, and
- removing the assembly from the mold.

9. The method according to claim 8, wherein curing is performed between any of the steps of arranging the skins and the core.

10. The method according to claim 8, wherein the backing structure is formed by arranging elongated parts of the first backing structure skin, the backing structure core and the second backing structure skin in a pattern in at least two directions across the back surface of the reflector dish.

11. The method according to claim 10, further comprising:
- arranging a portion of the backing structure circumferential on the back surface of the reflector dish.

12. The method according to claim 8, further comprising:
- producing a reflector dish assembly on the mold tool before forming the backing structure producing the reflector dish assembly comprising
  - arranging a first reflector dish skin on a mold tool,
  - arranging a reflector dish core on the first reflector dish skin,
  - arranging a second reflector dish skin on the reflector core, and
  - curing the reflector dish assembly.

* * * * *

UNITED STATES PATENT AND TRADEMARK OFFICE
CERTIFICATE OF CORRECTION

PATENT NO. : 8,089,422 B2
APPLICATION NO. : 12/293178
DATED : January 3, 2012
INVENTOR(S) : Mikael Petersson It is certified that error appears in the above-identified patent and that said Letters Patent is hereby corrected as shown below:

Title page, item [73] Assignee "Saab AB" should be changed to

--Ruag Aerospace Sweden AB--

Signed and Sealed this
Twenty-eighth Day of May, 2013

Teresa Stanek Rea
*Acting Director of the United States Patent and Trademark Office*